United States Patent
Menzies et al.

(10) Patent No.: US 6,317,748 B1
(45) Date of Patent: Nov. 13, 2001

(54) MANAGEMENT INFORMATION TO OBJECT MAPPING AND CORRELATOR

(75) Inventors: Steven J. Menzies, Issaquah; Syed N. Ahmed, Redmond; Kenneth M. Osborne, Issaquah; Rajeev Byrisetty, Bellevue, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/074,853

(22) Filed: May 8, 1998

(51) Int. Cl.[7] .................................................. G06F 17/00
(52) U.S. Cl. ............................... 707/103 X; 707/103 Y; 707/103 R
(58) Field of Search ..................... 704/223, 224; 707/103, 100, 101, 4, 103 R, 103 Y, 103 Z

(56) References Cited

U.S. PATENT DOCUMENTS

| | | | |
|---|---|---|---|
| 5,291,583 | * 3/1994 | Bapat | 395/705 |
| 5,509,123 | * 4/1996 | Dobbins et al. | 395/200.15 |
| 5,659,736 | * 8/1997 | Hasegawa et al. | 395/611 |
| 5,696,697 | * 12/1997 | Blau et al. | 364/514 |
| 5,729,739 | * 3/1998 | Cantin et al. | 707/103 |
| 5,794,248 | * 8/1998 | Blackman et al. | 707/103 |
| 5,797,137 | * 8/1998 | Golshani et al. | 707/4 |
| 5,870,749 | * 2/1999 | Adusumilli | 707/101 |
| 5,893,107 | * 4/1999 | Chan et al. | 707/103 |
| 5,951,649 | * 9/1999 | Dobbins et al. | 709/238 |
| 5,956,730 | * 9/1999 | Burroughs et al. | 707/104 |
| 5,983,233 | * 11/1999 | Potonniee | 707/103 |
| 6,003,035 | * 12/1999 | Breame | 707/102 |
| 6,081,808 | * 6/2000 | Blackman et al. | 707/103 |

OTHER PUBLICATIONS

Thompson, J. Patrick. Web–Based Enterprise Management Architecture, IEEE Online. Mar. 1998. pp. 80–86.*
Laukkanen, M. SNMP Based Network Management Using Corbra. IEEEOnline.–Feb. 20, 1998. pp 276–279.*
Henniger et al. Specification And Testing Of The Behavior Of Network Management Agents Using SDL–92. IEEE Online. Dec. 1996. pp. 951–961.*

* cited by examiner

*Primary Examiner*—Glenton B. Burgess
*Assistant Examiner*—Nkosi N Trim
(74) *Attorney, Agent, or Firm*—Michalik & Wylie, PLLC

(57) ABSTRACT

A method and system to provide management information of network devices by mapping between SNMP MIB module schema and Common Information Model (CIM) schema. MIB modules are tree-structured lists of objects for describing SNMP network device information, whereas CIM schema employs user-intuitive, object-oriented classes to model such information. A mapping process enumerates the MIB objects and then maps the objects into CIM Managed Object Format (MOF) classes using defined mapping tables. A correlation mechanism is further provided to efficiently determine in real time which MIBs (or portions thereof) and corresponding CIM classes a network device supports.

16 Claims, 11 Drawing Sheets

MANAGEMENT INFORMATION TO OBJECT MAPPING AND CORRELATOR

FIELD OF THE INVENTION

The invention relates generally to the management of device and other information on computer systems or networks, and more particularly to an improved system and method for providing management information.

BACKGROUND OF THE INVENTION

Network administrators are presently using a collection of technologies referred to as web-based enterprise management (WBEM) to manage network and other information of an enterprise. For example, network administrators run WEBM-compatible management applications to perform such tasks as detect machines on a network, inventory software and hardware configurations, and send key information back to a central database. The results of the communication may appear on a user interface so as to allow administrators to view the data of the network device. Such management applications and components receive this information from a variety of disparate sources, some of which are network devices. By way of example, a management application or component may wish to communicate with remote disk drive software (i.e., an agent) to determine how much free space remains on a network drive, or communicate with a router agent determine some property of a router.

In general, network device agents provide such management information via a standard known as the Simple Network Management Protocol (SNMP). In accordance with SNMP, the management component uses Management Information Bases (MIBs) to describe the structure of the data available at the network device. MIBs are published structures of static information that relate to the dynamic information provided by a network device. For example, a particular MIB might describe information such as an association between a device's data entity and a name (object identifier), a definition of the data type for that entity, a textual description of the entity, how the entity is indexed, if the entity is a member of a complex data type and the access allowed for that entity. The management component then is able to describe the data made available on the SNMP device (e.g., in response to a query or event) by using an appropriate MIB module to model that data.

A recent improvement in management information technology provides a centralized object manager and schema that provide uniform rendering of management information to client management applications. The object manager and schema are described in U.S. patent application Ser. No. 09/020,146, entitled "Object Manager for Common Information Model," assigned to the assignee of the present invention and hereby incorporated by reference in its entirety. In general, the Common Information Model (CIM) is an object-oriented technology, wherein the components of CIM, such as classes, instances, and qualifiers may be conveniently described in a user-intuitive textual format known as Managed Object Format (MOF), (described below). A CIM object Manager (described below) preferably operates on information on CIM objects described via MOF.

In contrast, MIB modules are not user-intuitive, but rather consist of complex, tree-based structures using object identifiers (OIDs) to describe locations in the tree. An OID is a unique identifier assigned to a specific object, consisting of a variable length sequence of numbers that identify the source of the object as well as the object itself. MIB OIDs are thus unique values organized into a tree structure, wherein the sequence of numbers identifies the various branches of the subtree that a given MIB object comes from. For example, SNMP objects are members of the subtree identified by "iso.org.dod.internet," which has a defined OID of 1.3.6.1. In this notation, subsequent numbers further define the exact location of a MIB object under that subtree. In short, a primary problem is that SNMP devices utilize these complex MIB modules, while the CIM object manager (which significantly improves enterprise management) use CIM objects.

Moreover, different network devices support different MIB modules, some of which are standardized based on the particular type of device (e.g., IP MIBs, IPX MIBs for routers) while others are proprietary MIBs published by a device manufacturer or the like to provide some value-added device data to their device. A large number of MIB modules, on the order of thousands, have been published, and a similarly large number thereof may be maintained in a repository of a given CIM installation. However, given an arbitrary device, the various MIB modules (or part thereof) supported by that device are not necessarily known. To be manageable via a CIM object manager (CIMOM), however, the subset of supported MIBs needs to be known. Because of time and network bandwidth considerations, there is no straightforward way to query the devices to determine the subset of the total set of MIBS supported thereby. For example, although SNMP devices respond to a Get (OID) operation to answer whether a particular object (specified by its OID) is supported, it is impractical to individually query the device in real time with each of the (relatively large number of) OIDs to see which of the set are supported. As a result, given an arbitrary device, another problem with some SNMP (e.g., version 1) MIBs is that there has heretofore been no efficient way in which to determine the subset of MIB modules (or portion thereof) that the given device supports.

SUMMARY OF THE INVENTION

Briefly, the present invention provides a method and system for mapping SNMP Management Information Base (MIB) objects to object classes, particularly MOF-described object classes. To this end, the objects in a MIB are enumerated by a compiler process, and a determination is made for each enumerated object as to whether the MIB object corresponds to a scalar collection (one unique instance) or a table collection (multiple possible instances). If, the MIB object corresponds to a scalar collection, the MIB object is mapped to a singleton MOF class, such as by accessing a mapping table to translate the MIB object information to MOF class information. If the MIB object corresponds to a table collection, the MIB object information is mapped to a class capable of describing a plurality of instances, such as a keyed MOF object.

A correlator is further provided to efficiently determine which object classes are supported by a given network device. To this end, the correlator first traverses the MIB trees of groups maintained at a CIM installation and creates a range table of groups and corresponding ranges of object IDs therefrom. Then, successively using range starting OIDs from the range table, the device is requested to return its next highest Object ID beyond an object ID provided thereto that is based on a range value. If the returned object ID falls into a range, the group of object classes corresponding to that range in the range table is known to be supported by the device, whereby that group's subsequent entries in the range table need not be tested and are eliminated from the range table. Also, any prior ranges below the returned OID are known to be not supported, and those ranges are eliminated from the range table. The process is successively repeated using remaining ranges to provide OIDs until the range table has no entries remaining.

Other advantages will become apparent from the following detailed description when taken in conjunction with the drawings, in which:

DETAILED DESCRIPTION OF THE PREFERRED EMBODIMENT

Copyright Notice

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Exemplary Operating Environment

Figure 1:
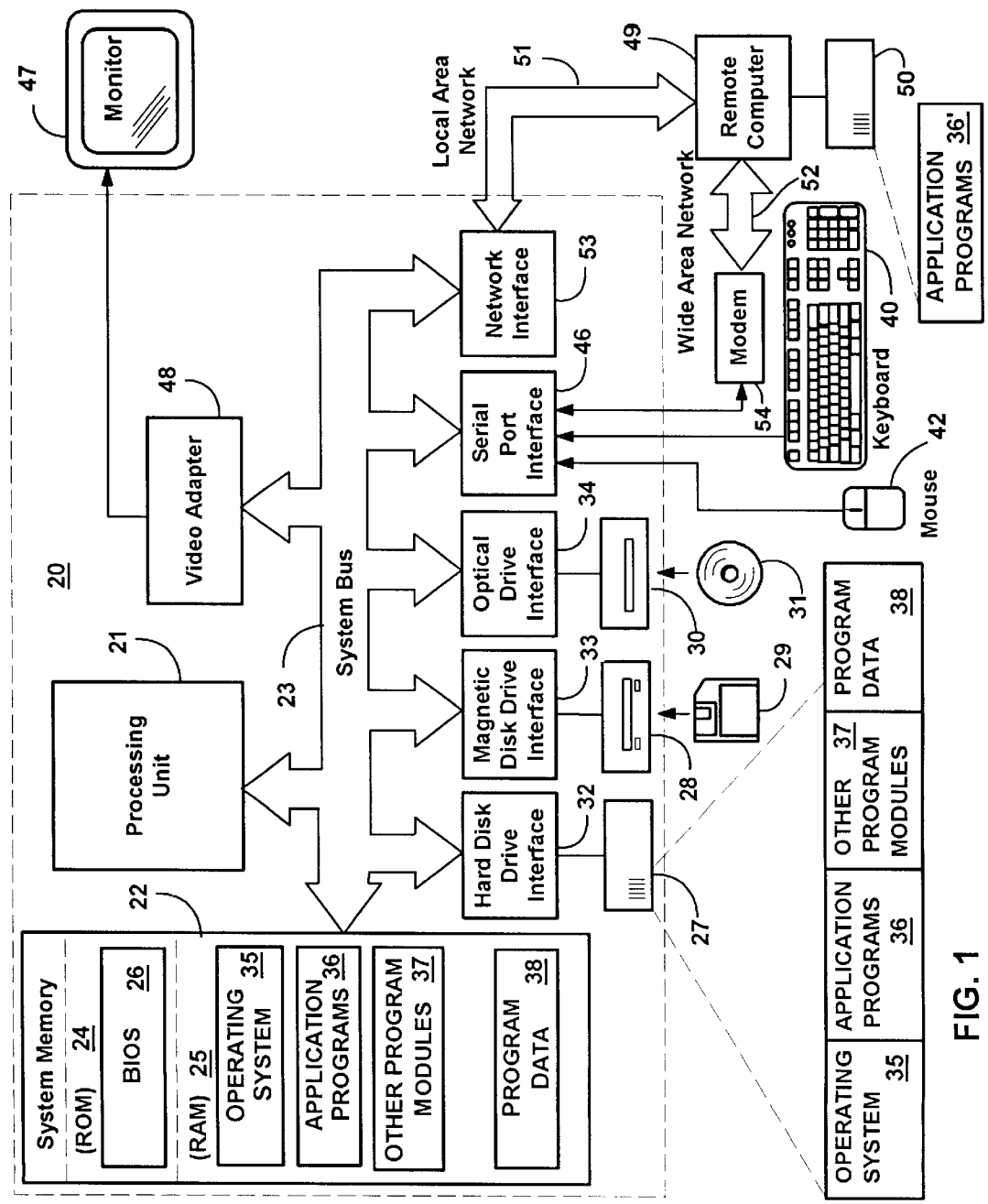
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The Common Information Model Architecture

Figure 2:
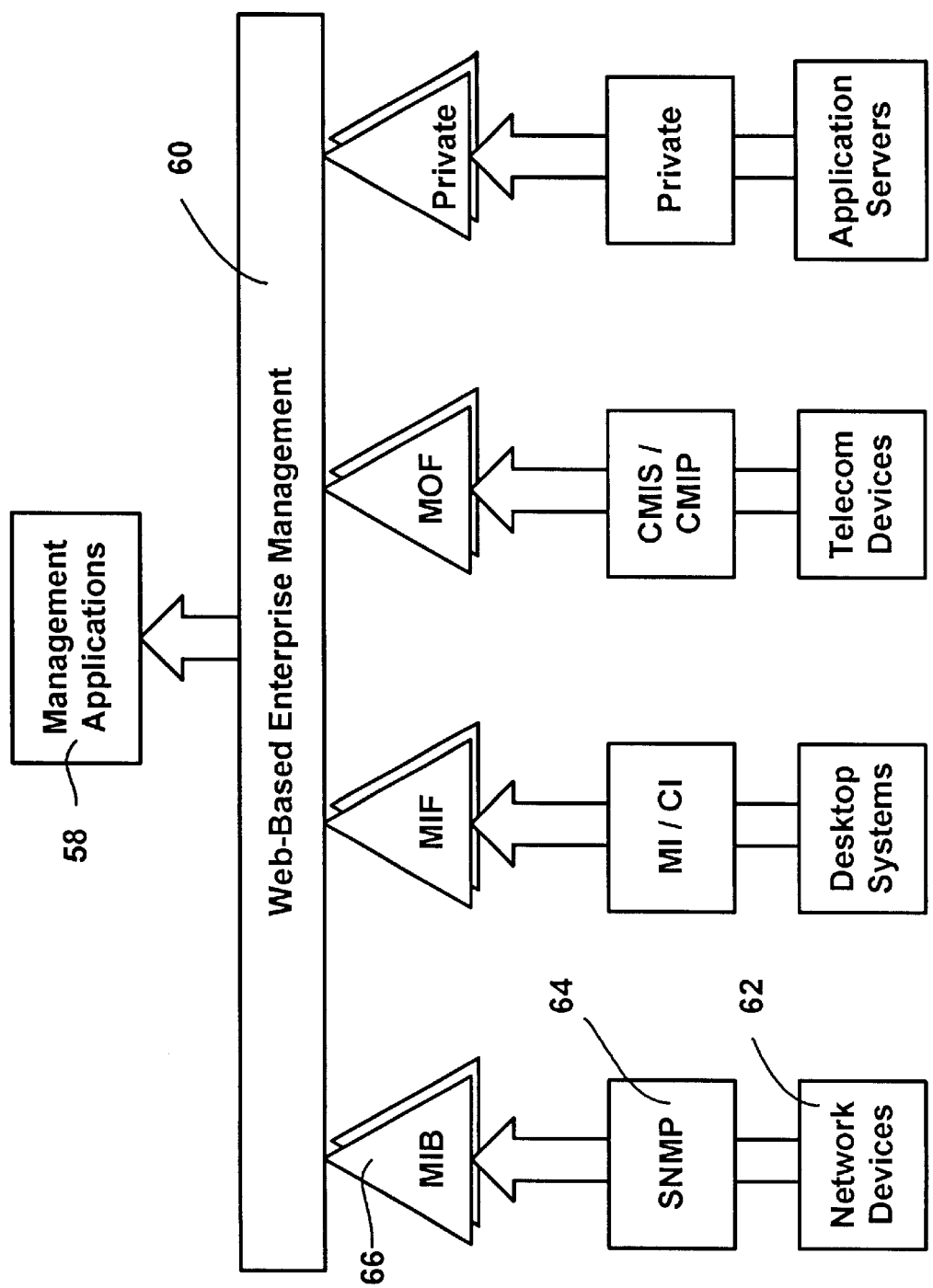
FIG. 2 is a block diagram representing a general conceptual model of web based enterprise management technology.

FIG. 2 represents the general concept of Web-Based Enterprise Management. As shown in FIG. 2, various sources provide information to management applications 58 in a defined format, via an appropriate protocol, through a management layer 60. For example, as shown in FIG. 2, network devices 62 provide their information via the SNMP protocol 64, which utilizes MIBs 66 as described above.

In general, the management layer 60 isolates the management applications 58 from having to deal with the many possible protocols and data formats. Central to the management layer 60 is a data representation formalism (schema) for managed objects known as the Common Information Model (CIM). In a CIM installation 68 (FIG. 3), a process acting in the role of a client makes management requests, while a process acting as a server satisfies each requested task and returns an appropriate response via uniformly rendered managed objects. In a CIM installation 68, clients may be simple processes dedicated to the management of particular devices or machines, or, for example, may be general-purpose interactive browsers capable of managing objects. Servers may also be implemented in multiple levels. In high-complexity environments, servers may be running on workstations with complex object stores, and act as proxies for many different managed devices. In lower complexity settings, servers may be simple network devices with no object store, implementing only a subset of a communication protocol. Moreover, the roles of servers and clients may be combined to form hierarchical and/or distributed management. For example, a client can make a request of a server, and that server in turn can switch roles and become a client of yet another server in order to carry out the operation.

Figure 3:
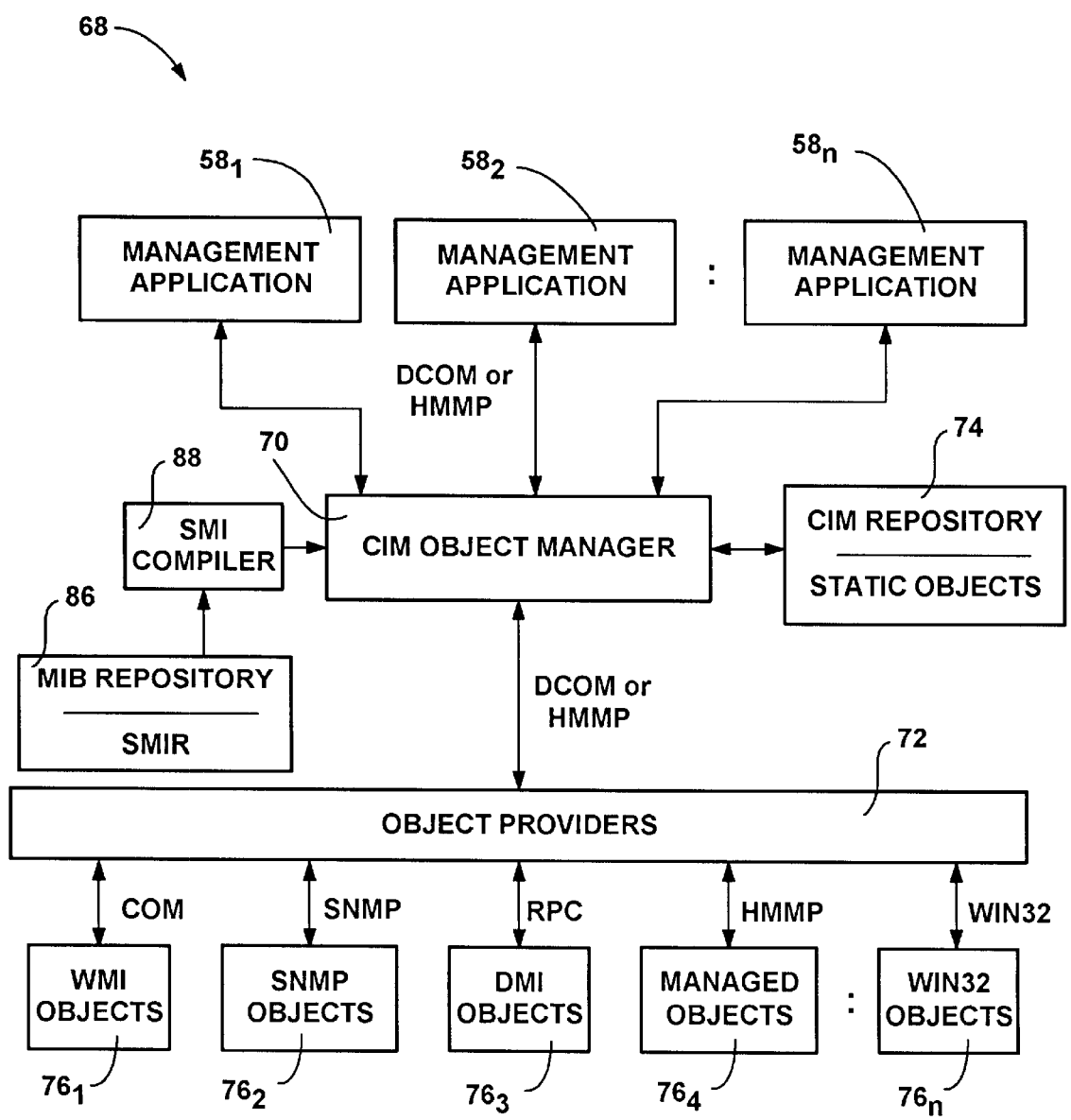
FIG. 3 is a block diagram generally representing an architecture of the common information model for working with management information.

In any event, the general architecture of a CIM installation 68 is shown in FIG. 3, wherein management applications $58_1$–$58_n$ are clients which communicate management information requests with a server known as a Common Information Model Object Manager (CIM Object Manager, or CIMOM) 70, described in more detail in the aforementioned U.S. patent application Ser. No. 09/020,146. Preferably, the client applications $58_1$–$58_n$ communicate with the CIMOM server 70 using the Distributed Component Object Model (DCOM), i.e., by invoking methods of objects in the CIMOM server 70 over an underlying protocol such as TCP. Alternatively, the client applications $58_1$–$58_n$ may communicate with the CIMOM server 70 using the HyperMedia Management Protocol (HMMP). HMMP provides management services across platform boundaries by defining a common network access model, a common schema, and a common security model. Both DCOM and HMMP are well-documented, and as will become apparent below, are not necessary to the present invention, as any protocol capable of passing object information to and from the CIMOM 70 may be used. As such, for purposes of simplicity, DCOM and HMMP will not be described in detail herein, but will generally be referred to as "the CIMOM communication protocol" unless otherwise specified.

The CIMOM 70 is a server which implements a large subset of the CIMOM communication protocol, and which switches roles so as to act as a proxy on behalf of client requests. As part of its function, the CIMOM 70 passes the client requests to appropriate servers known as object providers (or simply providers) 72. Providers 72 typically implement a smaller subset of the CIMOM communication protocol and do not switch roles. By way of example, one type of provider is a software driver or the like supplied by a vendor to accompany a hardware device such as a disk drive.

Figure 4:
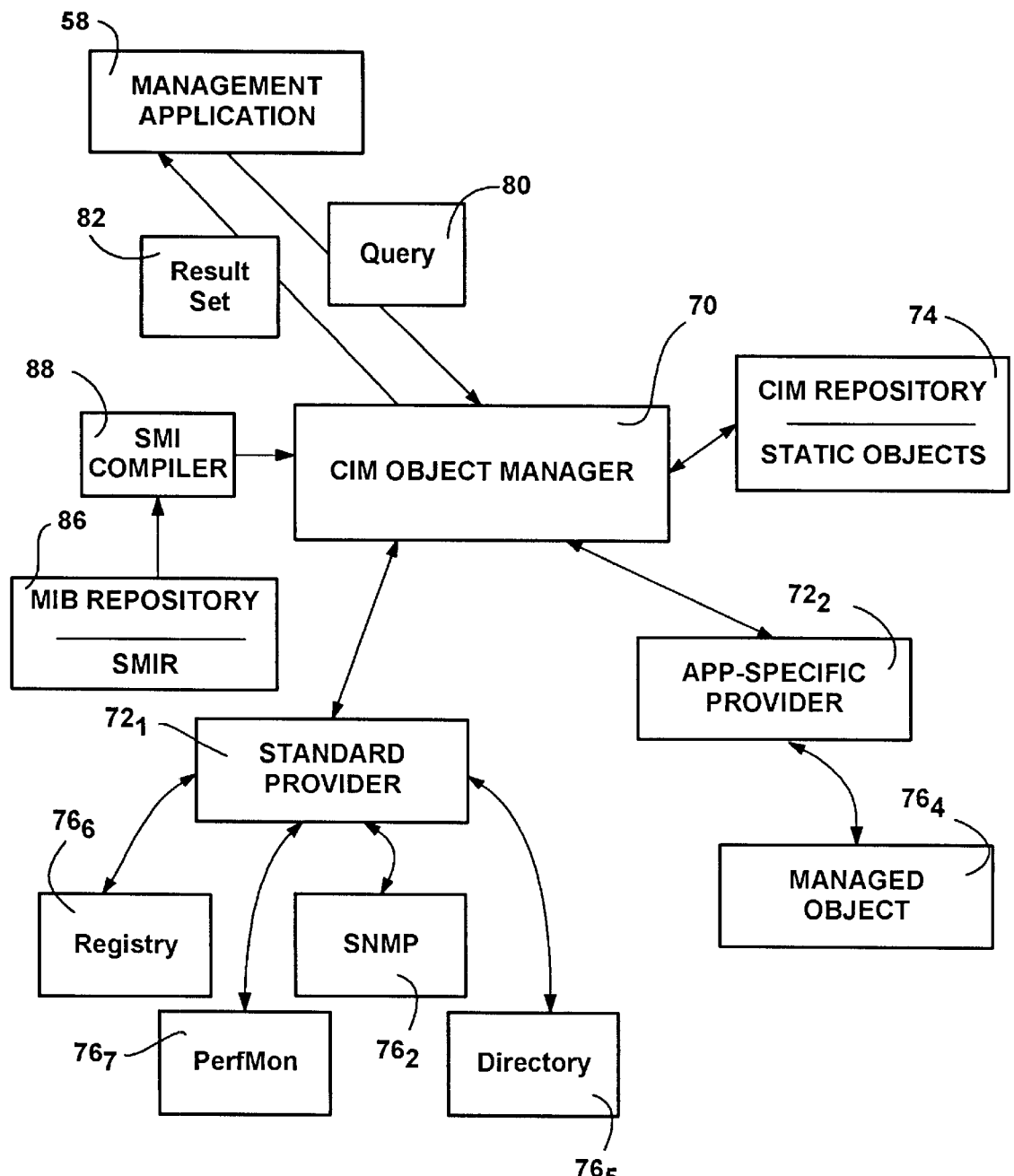
FIG. 4 is a block diagram generally representing an object manager communicating with applications and various providers to return management information.

As represented in FIG. 4, in order to service a request, the CIMOM 70 accesses a CIM repository 74 in order to determine which object provider or providers to contact (if any). More particularly, when a client sends a request to the CIMOM 70, the CIM repository 74 is accessed, which may have the information therein if static, and/or will provide the information necessary for locating the appropriate provider or providers which can satisfy the request. Thus, the CIMOM 70 will either directly satisfy a request or become a client itself and forward the request to an appropriate provider 72.

In this manner, through the CIMOM 70, clients are relieved of the burden of locating and directly managing a multitude of devices on the network. Instead, the CIMOM 70 hides the management complexity by distributing the request to the appropriate providers 72. As shown in FIG. 3, the providers 72 gather the necessary data from the devices $76_1$–$76_n$ using vendor or protocol-specific mechanisms such as DMI, SNMP, CMIP or a proprietary mechanism, and return the data to the requesting CIMOM 70.

Providers fall naturally into various categories, depending on the types of management capabilities they provide. For example, a provider may be constructed to return only a single dynamic value obtained in real-time from a hardware device. Alternately, a more complex provider might be desirable for a full instrumentation of a series of similar complex devices, such as network routers. In both cases, the resulting server is primarily thought of as a provider, since the instrumentation is dedicated to a narrow range of capabilities.

Thus, there are static providers, which are object class instances (described below) imported into and resident in the CIM database 74. For example, the name and description of an application, or the vendor and release level of a PC card both comprise information which is available at installation time and rarely ever (if at all) changes thereafter. There are also property providers, which are capable of providing and setting single property values, given a static definition of the class and instance as described below. As also described below, there are instance providers, which are capable of providing multiple keyed instances of a particular class or classes, and class providers, which are capable of providing new CIM classes describing CIM objects. Lastly, there are namespace providers, which are capable of providing new namespaces (described below) into the model that group objects in a particular manner. Other providers are feasible, and any given Provider can be any combination of the above types. Unlike individual providers, a CIMOM 70 typically acts as a proxy to many providers 72, allowing the client 58 a single point of management for a wide range of manageable objects 76₁–76ₙ.

The Common Information Model (CIM) defines the model used to represent the real-world objects being managed. CIM uses an object-oriented paradigm, wherein manageable objects are modeled using the concepts of classes and instances. The logical view of CIM is similar to the view of an object-oriented database, in which protocol operations carry out changes to this schema. For example, the Put Class protocol operation is used to create a class definition within the targeted server, while the Get Instance operation retrieves an object from the server that describes a particular instance of some managed object, such as a network device. The components of CIM, such as classes, instances, and qualifiers can be conveniently described in a textual format known as Managed Object Format (MOF), as shown below.

The meta-schema objects of CIM are components used to model a managed object using CIM. The objects present are classes, instances, properties, and qualifiers. Classes are models or templates for manageable objects, while instances are occurrences of classes, properties are the individual fields of classes or instances, and qualifiers are modifiers of any of these. In CIM, objects are essentially representation objects, i.e., the data object manipulated by a user of CIM is typically a proxy or representation of a real device. Locally, the server binds the representation object to the real-world device through various instrumentation methodologies specific to a particular system.

By way of example, the CIM installation 68 may include a Printer object, however, the object is not the actual printer, but a model of a printer. Performing an operation on the Printer object, such as examining its "Status" property, appears as a simple database query to retrieve the value, but the local implementation may in fact invoke systems software in real-time to retrieve the value of the Status property. Thus, CIMOM has presented the device and its status values in the form of a "virtualized" database. Whether CIM objects are purely data or tied to devices through instrumentation is not relevant to their appearance to a CIM client. CIM objects, being representation objects, are treated in a uniform manner as objects within the schema, whether or not there is an object store, instrumentation, or a mix of both.

The basic definition of a unit of management is the class. A class is a named, structured data type, containing individual data item fields called properties. A class is a template for a representation object for a set of devices which match the class definition. By way of example, the MOF definition for an exemplary class called "Disk" might appear as in the table below:

```
Class Disk
{
    string Volume;
    string FileSystem;
    uint32 TotalCapacity;
    uint32 FreeSpace;
};
```

This class models a disk wherein the four property fields describe individual aspects of a disk. While most classes are representation objects for real-world devices, there is no restriction on the content, or the application of the class to a particular managed object, although a particular CIM implementation may place limits on the number of properties in a class, the types of properties, or other similar limits.

As in object-oriented paradigms, classes can be derived from superclasses. A derived class implicitly inherits or contains the entire contents of the superclass. For purposes of simplicity, the present CIM meta-model supports single inheritance only, although more complex inheritance models are feasible. As used with respect to CIM, the terms base class and superclass may be used interchangeably to indicate a parent, while the terms derived class or subclass may be used to indicate a child class.

The fields of a class definition are called properties, and are named values subject to naming guidelines in a CIM implementation. A wide range of sized integer types are supported (both signed and unsigned), along with IEEE four and eight byte floating point values, UNICODE strings, dates and times, and other known types. Further refinement of the semantics of property values is achieved through the use of qualifiers. By way of example, qualifiers applied to properties may give additional semantics of properties, such as whether a 32-bit integer is actually a 'counter' or a 'gauge' property type.

A class defines a template for describing managed objects. Based on a class definition, specific managed objects are defined using one or more instances of that class. If a class uniquely describes only one instance, it is referred to as a singleton class. Where the class models the real-world device or component in the general sense, each instance represents a specific occurrence of the class. Continuing with the above example in which a general (singleton) class called Disk was described, an instance of this previously described Disk class might appear in the MOF syntax as in the table below:

```
Instance of Disk
{
    Volume = "DISKC";
    FileSystem = "XFS";
    TotalCapacity = 240000000;
    FreeSpace = external;// Dynamically supplied by instrumentation
};
```

Note that since the FreeSpace parameter is highly volatile, in a typical implementation the value would be supplied by a provider 72, rather than being a stored or static value. As described in more detail below, the CIMOM 70 is capable of retrieving both the static and dynamic information from various sources including the CIM database 74 and/or appropriate providers 72, and returning the object instance to the application 58. In keeping with CIM, the database 74 and/or providers 72 provide their portion of the information without knowledge of its final destination, i.e., the identity of the client process, and the application 58 receives this information transparently, i.e., as instances of the class disk without knowledge of its actual source or sources.

A Qualifier is a modifier applied to a class definition, an instance, or a property. Qualifiers constitute meta-data, and are generally, though not necessarily, non-essential modifiers, in that removal of the qualifier should not substantially change the meaning of what was being modified. In MOF syntax, qualifiers are indicated by preceding a list of declarations, delimited by square brackets, as shown in the table below:

```
[description("This class models a disk")]
class Disk
{
    string Volume;
    [description("The name of the filesystem")] string FileSystem;
    uint32 TotalCapacity;
    uint32 FreeSpace; };
```

While the above qualifiers give additional information, their removal does not invalidate the definition of Disk. The presence and values of qualifiers may vary between CIM installations, even for the same class definitions. In general, if removal of a qualifier would seriously alter a class or instance definition, then that qualifier should be re-implemented as a property. Any number of user-defined qualifiers may be applied to class definitions, instances, or any of the properties.

As in relational database models, instance identification for a class capable of describing multiple instances (i.e., a keyed class) is done through the use of keys. Using the table and column model common to relation databases, the table corresponds to a CIM class, and the rows correspond to CIM instances. The column or columns which uniquely identify the row are designated as keys. Key properties are designated by attaching a qualifier named 'key' to each property that constitutes the key for the class. Key qualifiers can be attached to more than one property to create a compound key. Using the MOF Syntax as an illustration, the Volume property has been designated as the key for the Disk class as shown in the table below:

```
Class Disk
{
    [key] string Volume;
    string FileSystem;
    uint32 TotalCapacity;
    uint32 FreeSpace;
};
```

The above definition of Disk specifies that the Volume property is used to distinguish instances within the class Disk (and its derived classes), and that there is one unique value of Volume for each real disk on the machine. The other property values can be duplicated across instances. For example, many volumes could support the same FileSystem or TotalCapacity values, and thus such properties would be poor choices for instance discrimination.

Certain rules for selecting and using keys apply. For any given class hierarchy, once a key has been introduced it may not be overridden or supplemented by any derived classes. For example, an abstract class SystemElement could be introduced which defines no properties at all, so it would be legal to derive several other classes from it, each introducing their own particular key values. However, no derived classes of each of those subclasses could in turn introduce their own keys. In sum, classes inherit the key of any superclass, if there is one, and only if there is not a key value in the superclass chain is a class permitted to introduce its own key.

Since CIM instances belong to a class and reside in a particular namespace on a particular host, some method of locating or referring to a particular object is required. This takes the form of an Object Path, which is conceptually similar to a URL (Uniform Resource Locator). Object paths come in several varieties. They can be relative to a particular server, relative to the entire network, or relative to a particular namespace, just as file paths in a file system may be relative to a particular sub-directory or volume. As an illustration, a full network-relative object path might appear as //myhost/root/default:disk.volume="C", wherein the first field after the leading double-slash is the server address (network address or host name, i.e., "myhost"). This is followed by the relevant namespace ("root/default") within that server, and the class ("disk") of the desired object. Finally the key values (the property "volume" whose value is "C"), which uniquely designate that instance within the class, are specified.

A Namespace is a fundamental grouping unit for sets of classes and instances. A namespace has an effect on the scoping of classes within it. By default, the instances of a class are private to a particular namespace, i.e., instances with the same key may exist in another namespace, but two instances of a class with matching keys are considered to be the same instance within a namespace. By default, a class definition is private to each namespace. However, any given class, while present in more than one namespace, may not have a definition which is at variance from its definition in another namespace.

A system is permitted to have single copies of class definitions for its supported namespaces and use reference counting or other mechanisms for the sake of efficiency. Namespaces can be nested in a manner similar to a hierarchical file system. In relational database terminology, a Namespace is similar to a database, except that nesting is possible. The base namespace for all CIM implementations comprises the classes and instances constituting the representation objects for the local host device or machine.

Namespaces can be manipulated through the use of the standard system class __Namespace. Creation of an instance of class __Namespace results in the creation of a real logical namespace within the CIM implementation. Note that there are two objects involved, the representation object and the actual namespace itself. Thus, an instance of __Namespace is a representation object for a real database namespace. Deletion of the __Namespace object results in deletion of all the classes and instances within that Namespace as well as deletion of the Namespace itself. Querying for instances of __Namespace is equivalent to querying for the actual list of namespaces supported by the CIM installation.

A special type of property called a reference is supported within CIM. This property is a "pointer" to another class or instance within the schema. A reference takes the form of a string which contains an object path. A special type of class which contains a pair of references is called an Association. Instances of association classes are used to set up a binding relationship between two other objects. For example, while it is possible for each of objects A and B to contain reference fields which point to each other, this would entail designing the class to contain a reference property from the outset. In many cases, it may not be known at class design-time which objects may require references to each other. Instead, classes are ordinarily designed to contain no assumptions about relationships in which they may participate. Instead, an association class C can be created after classes A and B are created, wherein C can contain two reference property fields, one which is designated as pointing to instances of A, and the other as pointing to instances of B. In this manner, associations can be used to create object relationships without the knowledge or participation of the objects themselves. Likewise, relationships can be removed without affecting the objects.

In a more specific example, it may sometimes be useful to associate a NetworkCard object with a NetworkProtocol object using a dedicated association class called NetCard-ToProtocolBinding. This is a desirable model, since a card may support more than one protocol, and the same protocol may be running over more than one network card on the host machine. The association objects describe the complex relationships without the more primitive objects being aware of it.

In order to deal with queries in a uniform manner, the CIMOM 70 supports the Execute Query protocol operation and preferably supports at least a minimal subset of ANSI SQL. Of course, additional query languages may be supported. In general, SQL specifies the syntax for a simple form of 'select' statements for executing read-only queries. Using this syntax, CIM classes (which may be stored in the CIM repository or retrieved from some source on the network) are represented as tables and CIM properties as columns, resulting in a natural SQL-like mapping. The result set of such a query is always a set of CIM instances.

By way of example, assume an administrator wants to locate all network disk drives that are running low on free disk space. As shown in FIG. 4, through a management application 58, the administrator submits to the CIMOM 70 an SQL query 80, —"select*from LogicalDisk where FreeSpace<20000000"—. The CIMOM 70 works in conjunction with one or more providers 76 and (as necessary) complements the capabilities of the providers to return a result set 82 comprising uniformly rendered managed objects. For example, the provider may not be capable of processing queries in high-level languages such as SQL, but may only be able to return a list of all the instances it supports. In this case, CIMOM 70 may transparently translate the user's high-level query into a series of simple retrievals and then perform the query internally on behalf of the user, giving the user the impression that the provider directly supported the query. Thus, the above-query results in a set of CIM objects (instances) of class LogicalDisk where the property value for FreeSpace is less than twenty million bytes.

Each operation within the CIM schema is modeled as a separate protocol operation. For example, most servers acting as CIMOMs will support class creation and update, class retrieval, class deletion, and instance creation and update, instance retrieval, instance deletion, and query execution. Each of these has a corresponding protocol operation. Servers acting as providers may only support one or two operations, such as "Get Instance" and "Put Instance." For example, to retrieve an instance of a particular class, the protocol operation "Get Instance" is used. Once the instance is obtained, it may be necessary to consult the class definition itself, and so a "Get Class" operation is executed.

Lastly, in a distributed environment, a client will construct a request packet for the desired protocol operation and send it to the server using an underlying network transport protocol, such as TCP. The reply packet or stream typically contains the result of the operation, or an error packet detailing why the operation could not be completed.

Common Information Model SNMP Mapping

Figure 5:
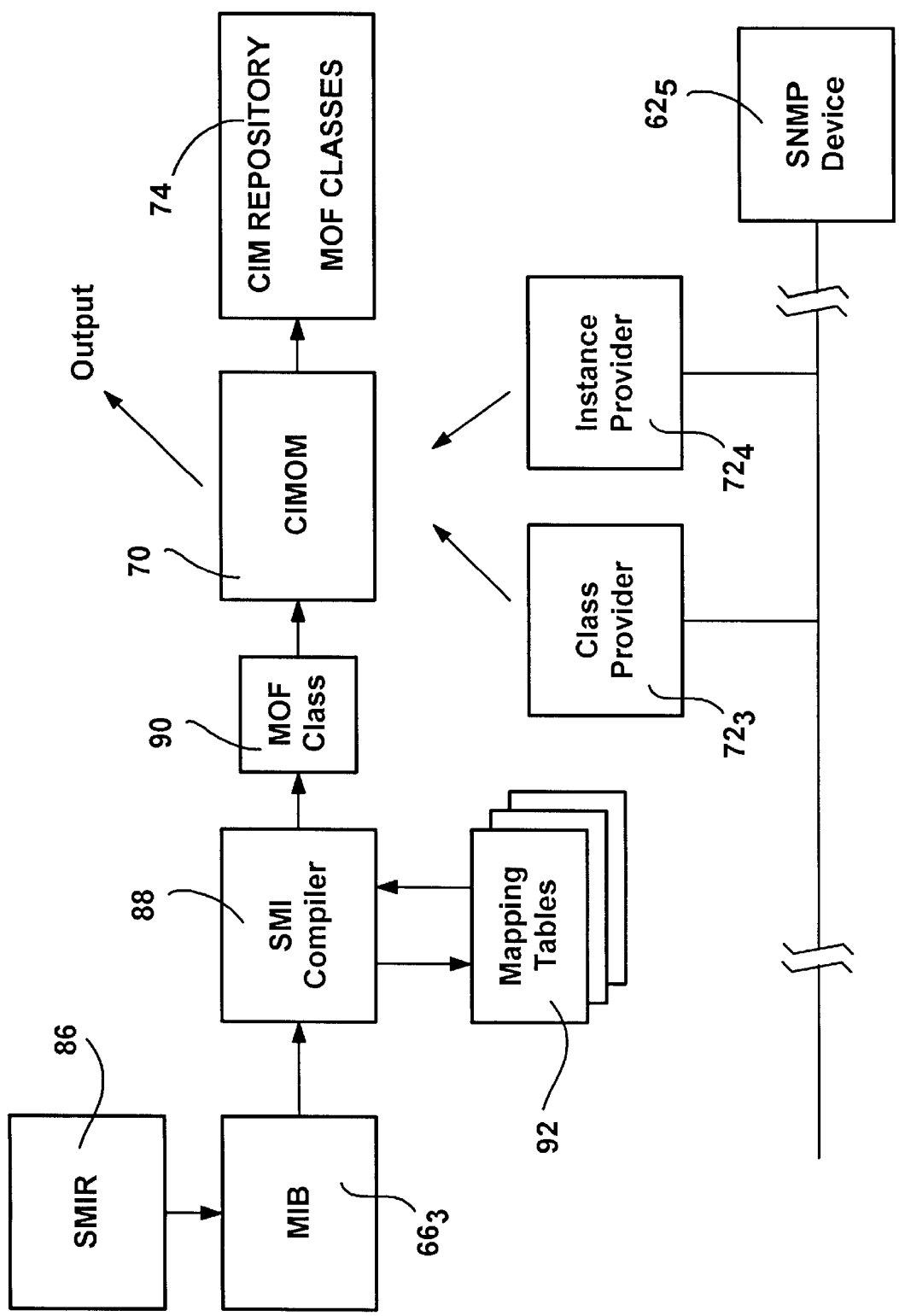
FIG. 5 is a block diagram generally representing the components for mapping a MIB object to a MOF class in accordance with one aspect of the present invention.

As shown in FIGS. 2–4, each network device provides information according to the SNMP standard for managing devices and for representing management data, i.e., via MIBs. As described above, MIBs are complex, tree-based structures, while the CIMOM 70 is set up to ideally operate with CIM objects. In accordance with one aspect of the present invention, there is provided a system and method that maps MIB information to CIM classes. FIG. 5 shows the general components for accomplishing the mapping.

As shown in FIG. 5, the set of MIBs in a CIM installation are maintained in a repository known as an SNMB MIB repository (SMIR) 86. In a CIM installation, each MIB such as the MIB $66_3$ is extracted from the SMIR 86 and translated by a SMI (Structure of Management Information) compiler 88 into a CIM object class 90, which is then provided to the CIMOM 70 and stored in the CIM repository 74. To this end, the SMI compiler references a number of mapping tables 92 to facilitate the translation. As dynamic information comes in from the SNMP device through the class provider $72_3$ and instance provider $72_4$, the CIMOM 70 is able to combine the dynamic information with the static MIB information now in the form of CIM classes to produce some desired instance output.

In general, in addition to a name, (module identity), a MIB contains two types of structures for describing dynamic device data, scalar collections and table collections. Scalar collections are collections of device properties having one unique value. Table collections can be thought of as having rows that describe multiple instances of a given type definition.

A MIB object type macro defines the structure of a given property and uses OIDs to define the namespace in the MIB tree structure wherein this information is stored. For example, a MIB might include the macro set forth in the following table:

```
myDescr OBJECT-TYPE
  SYNTAX OCTET STRING ( SIZE ( 0 . . . 255 ) )
  ACCESS read-only
  STATUS mandatory
  DESCRIPTION "My Scalar Description"
  ::= { 1.3.6.1.4.1.311.1 }
```

This identifies a scalar property "myDescr" of type string having read only access located at 1.3.6.1.4.1.311.1. Any number of such scalars may be in a MIB module. Similarly, a MIB may include one or more table collections, as set forth below:

```
myTable OBJECT-TYPE
  SYNTAX SEQUENCE OF MyEntry
  ACCESS not-accessible
  STATUS MANDATORY
  DESCRIPTION "My Table Description"
  ::= { 1.3.6.1.4.1.311.2 }
myEntry OBJECT-TYPE
  SYNTAX MyEntry
```

```
    ACCESS not-accessible
    STATUS mandatory
    DESCRIPTION "My Entry Description"
    ::= { 1.3.6.1.4.1.311.2.1 }
    MyEntry ::= SEQUENCE {
        INTEGER myKeyProperty ,
        OCTET STRING myValueProperty
    }
    myKeyProperty OBJECT-TYPE
    SYNTAX INTEGER
    ACCESS read-only
    STATUS mandatory
    DESCRIPTION "My Key Property"
    ::= { 1.3.6.1.4.1.311.2.1.1 }
    myValueProperty OBJECT-TYPE
    SYNTAX OCTET STRING
    ACCESS read-write
    STATUS mandatory
    DESCRIPTION "My Value Property"
    ::= { 1.3.6.1.4.1.311.2.1.2 }
```

In accordance with one aspect of the present invention, objects present within a table collection will map to properties of a CIM (which may be textually represented by MOF) keyed class definition (described above), while objects present within a scalar definition will map to properties of a singleton CIM class definition. For keyed CIM object classes, the keys are taken from the 'INDEX' clause of the table collection. Note that an index may be an SMI type (i.e., the table is accessed by an integer) or a property as shown above (i.e., the table is accessed by type which is also a property value).

Figure 6:
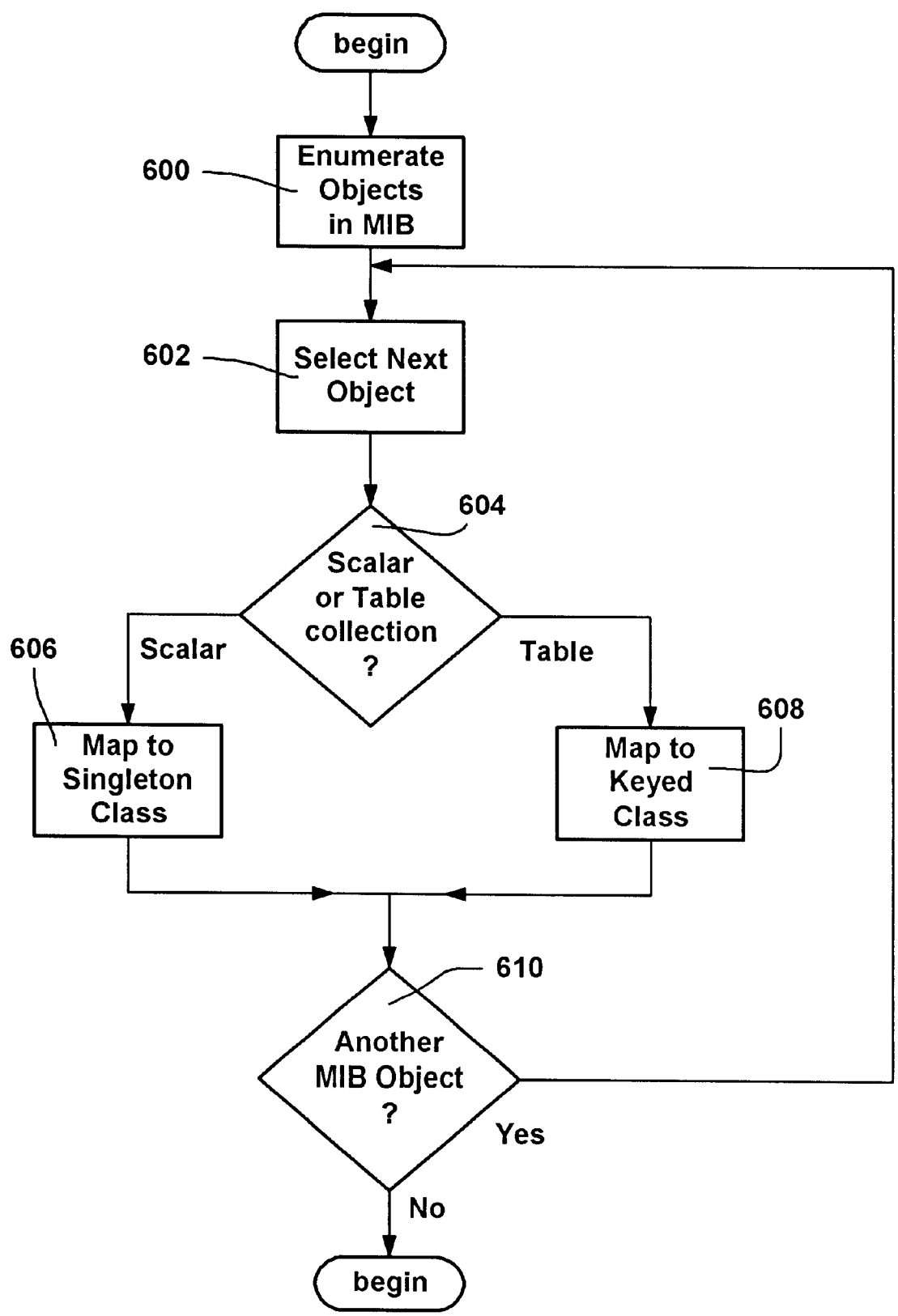
FIG. 6 is a flow diagram generally representing the steps taken by a mapping process to map a MIB object to a MOF class in accordance with one aspect of the present invention.

FIG. 6 generally represents the mapping process in the SMI compiler 88 for processing the MIB tree structure. First, at step 600, the collections identified in the MIB $66_3$ are enumerated. These scalar and table collections are then processed to translate them into CIM classes. To this end, step 602 begins by selecting the first collection, and step 604 determines whether the type is a scalar or table collection. Scalar collections are objects whose direct parent in the MIB tree is a named node. Objects having the same named parent are grouped together so that they will be placed in the same CIM class. In contrast, table collections are identified by a macro whose syntax includes the text "SEQUENCE OF . . . ." In addition, although not necessary to the present invention, the subtrees under a table collection may be examined to ensure that a collection having this sequence is indeed a table collection.

If step 604 determines that the MIB object is a scalar collection, the MIB object is mapped to a singleton class at step 606 (note that objects with a common parent share a class definition). This is a relatively straightforward operation, comprising extracting the MIB object name and basing a CIM class name thereon, (e.g., a prefix plus "SNMP" plus the MIB module name plus the name of the common parent), and then extracting the properties from the MIB object. These properties are then placed in the CIM class, by translating the various MIB types, textual conventions and so on to MOF counterparts using predefined mapping tables 92. CIM qualifiers are also used, such as to correspond to the MIB object's object type and access information. For purposes of simplicity, the various tables and other translation information are not set forth in detail herein, since a CIM to SNMP mapping specification, including the actual mapping tables, is attached hereto as Appendix A.

If instead step 604 determines that the object is a table collection, the compiling process branches to step 608 wherein the MIB object is mapped to a CIM keyed class that is capable of describing more than one instance. Again, this is a relatively straightforward operation, comprising essentially the same process as for scalar collections, i.e., extracting the MIB object name and basing a CIM class name thereon, and translating the various MIB types, textual conventions and so on to CIM counterparts using predefined mapping tables 92. However, in addition, the keys of the keyed class are extracted from the 'INDEX' clause of the table collection, which specifies a list of items, each item in the list being either an SMI type or a property name, that serves as one of the keys of the table.

Step 612, which detects the end of the enumerated objects, loops back as necessary to repeat the mapping process for the other enumerated objects of the MIB 663.

Lastly, it should be noted that mapping of TRAP-TYPE and NOTIFICATION-TYPE macro definitions is performed in substantially the same manner as for OBJECT-TYPE macros, except that it applies to event notifications. Essentially an event is some notification of a change in configuration or state of a management entity, wherein the semantics associated with that change are reflected in the name of the class and the properties within that class. In SNMP, events are modeled as TRAP-TYPE and NOTIFICATION-TYPE macros, whereas with CIM, events are simply class definitions. Thus, TRAP-TYPE macro and NOTIFICATION macros are mapped to CIM classes using the mapping procedure as set forth Appendix A. The event notification places an instance of the CIM class in the event notification.

SNMP MIB Correlator

As described above, a particular device supports only a subset of the MIBs (and thus the corresponding CIM classes compiled therefor) out of the (possibly) large set of possible MIBs (and compiled classes). In accordance with another aspect of the present invention, a correlation mechanism 94 (FIG. 7) is provided to determine in real time the subset of SNMP CIM classes that are supported by a particular network device. Correlation is performed on a group basis. An SNMP group is a collection of one or more scalars and/or tables that exist directly under a single named node in the MIB hierarchy. It does not include any other nodes that may also exist under such a node. Note that scalars and tables may exist in the gaps between the direct subgroups of a group. For purposes of simplicity, all aspects of correlation will not be described herein in detail, as a correlation specification is attached hereto as Appendix B. However, it is noted that a group may be the parent of subgroups, and in turn, a subgroup may also be the parent of subgroups. Note that a subgroup has the parent group's object identifier as part of its object identifier root, e.g., 1.2.4.2 may be a subgroup C of the group B (OID of 1.2.4), such as represented in FIG. 8.

Groups are relatively straightforward in that the scalars and tables in one group (e.g., group A) that is lexicographically before another group (e.g., group B) appear before the scalars and tables of that other group. However, with subgroups, this is not necessarily true. For example, consider two groups B and C having OIDs of 1.2.4 and 1.2.4.2, respectively. Lexicographically C comes after B, but B can have only one scalar with an object identifier before that of C, namely 1.2.4.1. If this is the only entity belonging to B that is supported, then all of C's tables and scalars will appear after B. However, if B has a scalar with an OID of 1.2.4.3, then the scalars and tables of C will now come before those of B. Furthermore, B can have both of scalars 1.2.4.1 and 1.2.4.3, in which case the scalars and tables of C will appear in between those of B. However, as will be described below, the correlation mechanism of the present invention traverses the groups and subgroups in a manner that builds a list of lexicographically ordered ranges that are used to efficiently determine the objects supported by a device.

Figure 7:
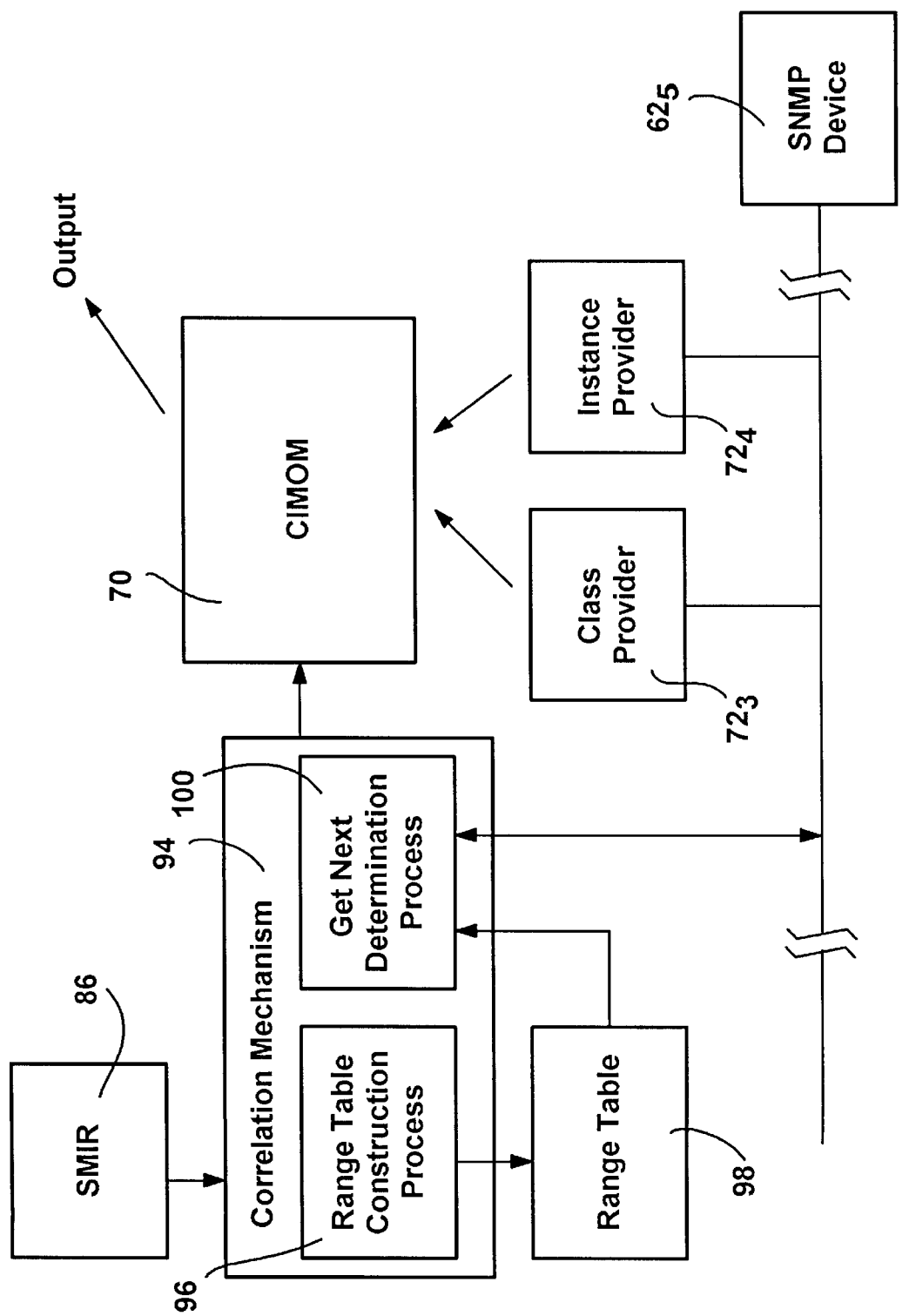
FIG. 7 is a block diagram generally representing the components for correlating which MIB groups and corresponding MOF classes are supported by a network device in accordance with one aspect of the present invention.
Figure 8:
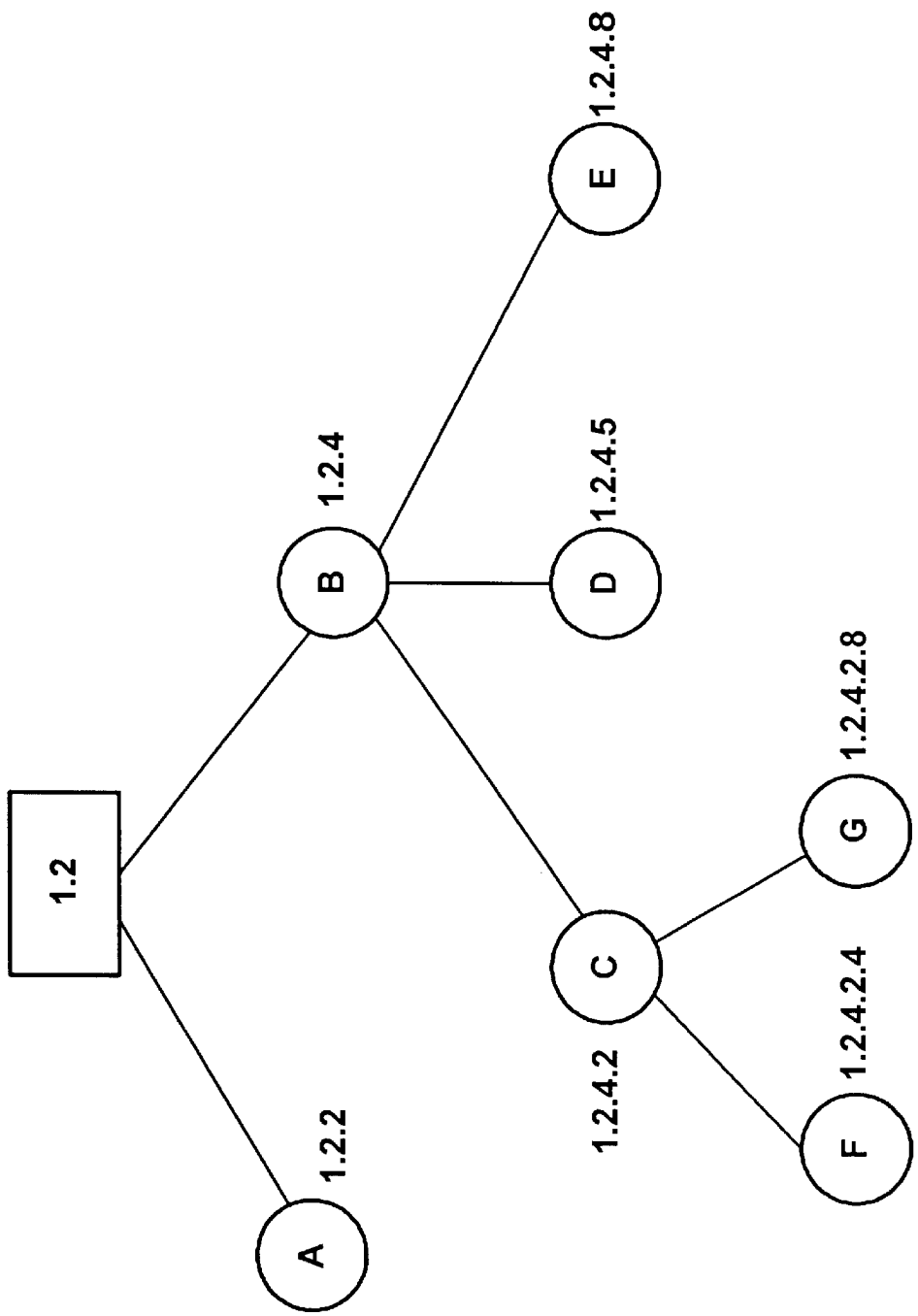
FIG. 8 is an exemplary tree structure representing groups and their object identifiers as arranged in one or more MIBs.

As shown in FIG. 7, the correlation mechanism comprises two parts, including a process 96 for creating a range table 98 and a process 100 which uses the range table 98 to efficiently query the device determine which groups (and thus which classes) are supported by a given device. A range table 98 is an ordered table of OID ranges corresponding to the MIB groups and subgroups stored in the SMIR 86.

To create a range table 98, it is first noted that SNMP group object identifiers in the SMIR 86 are ordered lexicographically according to their OID, i.e., each component is essentially considered to be a single 'character' having that component's numerical value. In other words, groups are sorted on a logical representation of the object identifier rather than on the string representation. For example, the group OIDs are ordered such that OID 1.1<1.2<1.2.1<1.2.1.5<1.3. From the MIB groups, a set of mutually exclusive ranges is created for each group (a group may have several other groups contained within its range). These ranges are ordered lexicographically, the result being the range table 98.

Figure 9:
FIG. 9 is a representation of a range table constructed in accordance with one aspect of the present invention.
Figure 10:
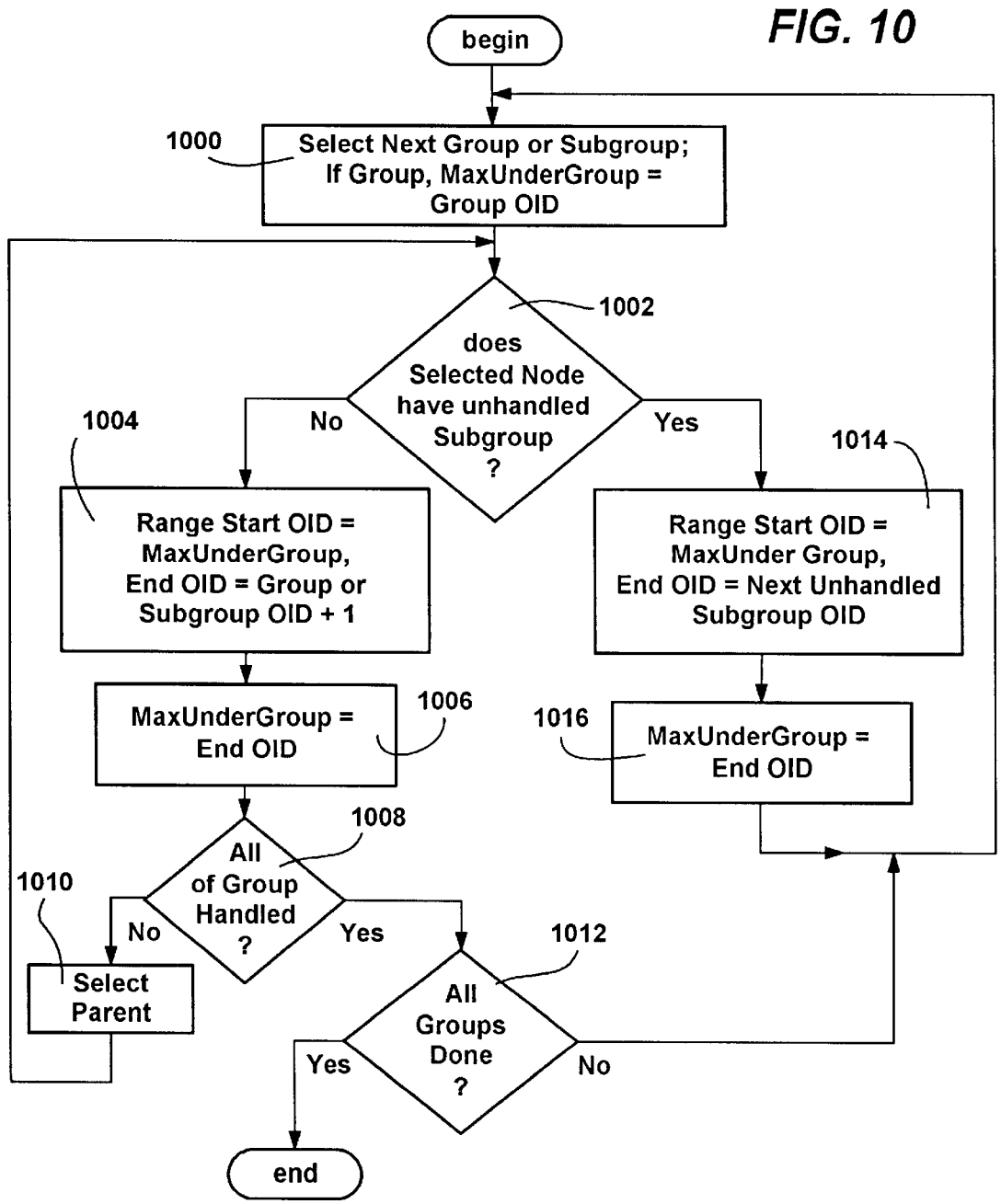
FIG. 10 is a flow diagram generally representing the steps taken to construct the range table of FIG. 9 based on the exemplary MIB tree structure of FIG. 8.

By way of example, a small tree of groups and subgroups is shown in FIG. 8, a range table 98 created therefrom is shown in FIG. 9, and FIG. 10 exemplifies steps which may be taken by the range construction process 96 to construct the range table 98. Note that the groups and subgroups for the MIBs in a typical SMIR will construct a tree having many thousands of groups and subgroups, however the correlation mechanism of the present invention is scalable to handle any number of groups.

As represented in FIG. 10, step 1000 begins by selecting the first group in lexicographical order, i.e., using a left to right, top-down, ordering. Thus, as represented in the tree of FIG. 8, the first group selected by the process 96 is the group A. Also at step 1000, since A is a group and not a subgroup, a variable (hereinafter referred to as "MaxUnderGroup") which tracks the maximum range OID under the current group (group A) is set to the group OID of group A, 1.2.2. Then, at step 1002, the tree is essentially examined to determine whether the currently selected group A is a parent of a subgroup that has not yet been handled by the range table construction process 96. In the tree of FIG. 8, group A does not have any subgroup thereunder, and the step 1002 thus branches to step 1004 to add a range to the range table 96. At step 1004, Group A is entered into the table in association with a range having a starting OID equal to the maximum thus far under the group, (as stored in the MaxUnderGroup variable), which is group A's OID of 1.2.2. Next, since Group A has no subgroups, the end OID for the entered range is set based on (i.e., set to just exceed) the highest possible OID for that group, by adding one to the last value, i.e., 1.2.3. As can be readily appreciated, this specifies a range of OIDs into which scalars and tables may possibly fall. Thus, as shown in FIG. 9, the first range entered into the range table 98 identifies group A within a range from 1.2.2 to 1.2.3. As can be readily appreciated, if a network device returns a table or scalar OID in this range, then the network device supports (at least some of) the classes under group A. Step 1006 changes the MaxUnderGroup variable to the end OID that was placed in the range table 98.

Step 1008 then tests to determine if all of the selected group (group A) including any subgroups thereunder have been handled by this process 96. In the present example, group A has no subgroups, and thus step 1008 branches to step 1012 to determine if all groups in the tree have been likewise handled, whereby if so, the range table construction process 96 is done (and thus ends). In the present example however, group B has not yet been handled, and thus the process returns to step 1000 where group B is selected.

Since group B is a group, (as opposed to a subgroup), the MaxUnderGroup variable is also set at step 1000 to group B's OID of 1.2.4. Step 1002 is next executed, however this time, step 1002 determines that the selected group B has subgroups thereunder that have not yet been handled, starting with subgroup C. As a result, step 1002 branches to step 1014 which writes group B into the range table with an associated starting range OID of 1.2.4, and an end range OID equal to that of the next unhandled subgroup's OID, subgroup C, which has an OID of 1.2.4.2. Next, step 1016 sets the MaxUnderGroup variable equal to that of the highest OID thus far recorded in the table of any group or subgroup under group B, that is, subgroup C's OID of 1.2.4.2. The process 96 then returns to step 1000 where the next subgroup, subgroup C, is selected.

At step 1000, the MaxUnderGroup OID variable is not changed since group C is not a group, but rather a subgroup. Then, step 1002 detects that selected group C also has an unhandled subgroup, beginning with subgroup F, whereby step 1002 branches to step 1014. Step 1014 records group C in the range table with a start OID equal to the current MaxUnderGroup value (1.2.4.2) and an end OID equal to the next unhandled subgroup's OID, (i.e., subgroup F, having an OID of 1.2.4.2.4). Step 1016 is next executed, which changes the MaxUnderGroup variable to this end OID, 1.2.4.2.4, before returning to step 1000 to select the next subgroup.

The next subgroup at step 1000 is the subgroup F. Since it is not a new group, the OID saved in the MaxUnderGroup variable is not changed, and the process continues to step 1002. Subgroup F does not have any unhandled subgroup(s) thereunder, and as a result, step 1002 branches to step 1004, wherein the start OID of the group F is recorded in the range table as the value stored in the MaxUnderGroup variable, 1.2.4.2.4. Again, since F has no subgroup, the end OID is set based on this value plus by adding one to the last digit, i.e., 1.2.4.2.5 (FIG. 9). At step 1006, the MaxUnderGroup variable is then set to this higher end OID value of 1.2.4.2.5. Step 1008 tests to determine if all of the group B has been handled. More particularly, this occurs when the selected node is a group (not a subgroup) and all subgroups under that group have been handled in the above manner by the range table construction process 96. Since subgroup F is not a group, nor have all subgroups under B been handled, step 1008 branches to step 1010 wherein the parent of the subgroup F, subgroups C, is again selected as the selected node.

Step 1010 returns to step 1002 where it is determined that subgroup C has another subgroup that has not been handled, subgroup G. Thus, step 1002 branches to step 1014 wherein group C is again entered into the range table 98 (FIG. 9) with a start OID equal to 1.2.4.2.5 (from the MaxUnderGroup variable) and an end OID of 1.2.4.2.8 (from the OID of Group G). At step 1016, the MaxUnderGroup variable is set to this end OID of 1.2.4.2.8, and the process returns to steps 1000 wherein subgroup G is selected as the current node. As can be appreciated by following the above examples, subgroup G is entered into the range table at step 1004 with a start OID of 1.2.4.2.8 and an end OID of 1.2.4.2.9. Note that when step 1010 is later executed, subgroup C is again selected as the selected node.

However, when subgroup C is next evaluated at step 1002, it will not have an unhandled subgroup, since its subgroups F and G have previously been handled as described above. Thus, subgroup C again will be entered into the table, however this time via step 1004, and thus will have a range from 1.2.4.2.9 to 1.2.4.3 (based on subgroup C's OID plus one). Then, at step 1010, the parent of subgroup C, i.e., group B, is again selected, and the process returns to step 1002.

For purposes of simplicity, a description of these steps will not be repeated in detail for the remaining groups and subgroups. As can be readily appreciated from following the steps of FIG. 10 in conjunction with the tree of FIG. 8, the table will be completed as shown in FIG. 9. Note, however, that via this process, a range for group B is again entered the next time through the steps, followed by a range for group D, then for group B again, then for group E, and lastly for group B again. Traversing the tree in this manner solves the lexicographical complications (described above) with respect to subgroups. At this time, a range table has now been created which may be used to determine which MIBs a device supports. Of course, the range table may be constructed once and persistently stored to avoid having to recreate it for each device, (and thereafter recreated such as only when new MIBs are added).

Once the range table 98 (FIG. 9) has been constructed, the ranges therein are used to determine which MIBs (and thus correspondingly mapped classes) a given device supports. To this end, the second part of the correlation mechanism 94 comprises the process 100 which applies the range values in a logical fashion to the device via a SNMP GetNext function. GetNext provides an OID to a device, and requests the device to return its next OID that lexicographically follows the provided OID. Using the returned OID, the supported classes may be rapidly and efficiently determined.

Figure 11:
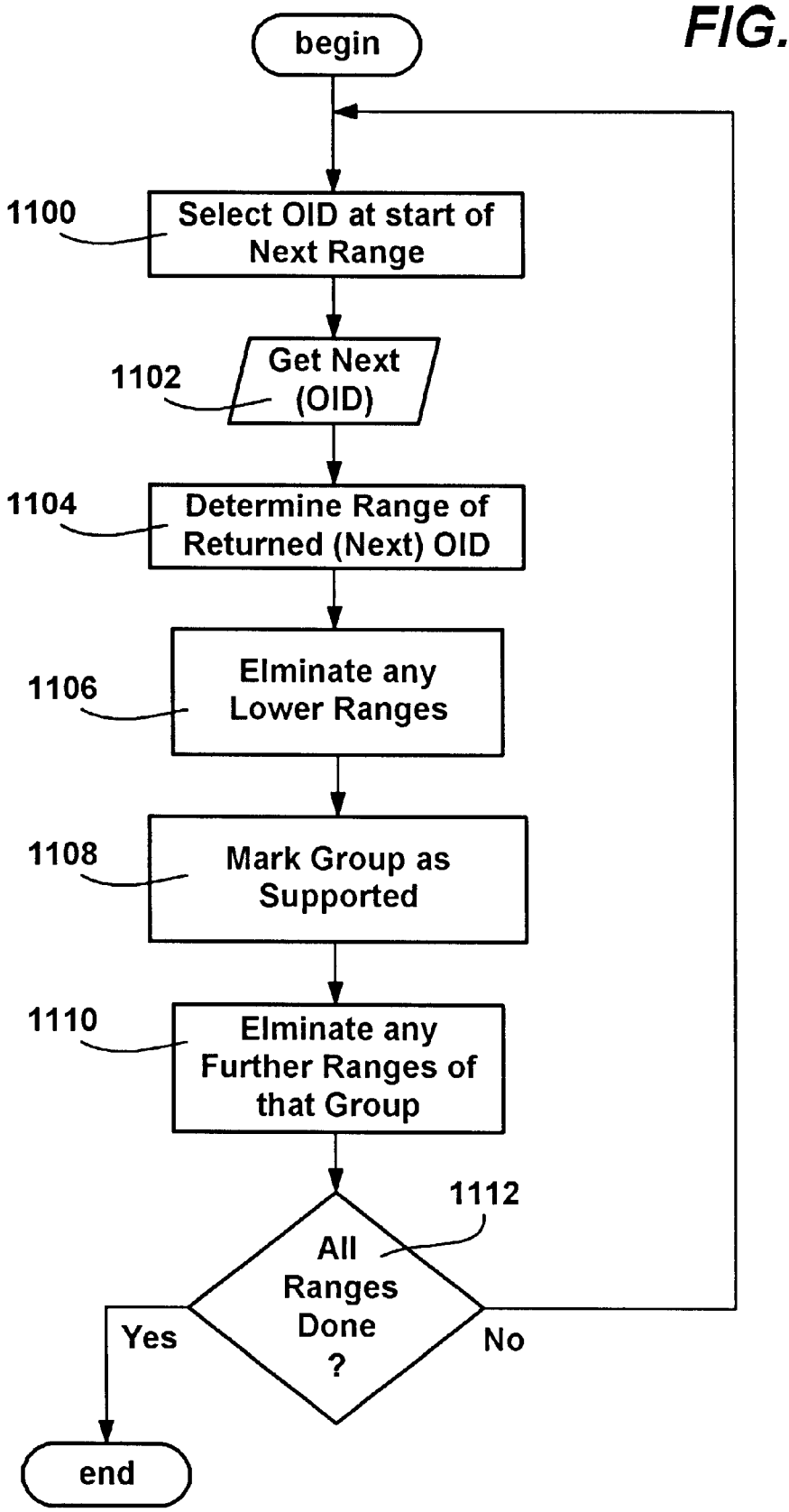
FIG. 11 is a flow diagram generally representing the steps taken to use a range table to determine which MIB groups are supported by a network device in accordance with one aspect of the present invention.

More particularly, as shown in FIG. 11, the process 100 begins at step 1100 by selecting the OID at the start of the next range, which at this time is the start OID of the first range, 1.2.2. At step 1102, this OID is used with the SNMP GetNext function to receive an OID from the device. For example, the device may return a scalar or table OID of 1.2.4.2.5.1, which, as determined by step 1104, falls into the second C range in the table, i.e., the range associated with the subgroup C entry that ranges from 1.2.4.2.5 to 1.2.4.2.8. Since this OID is beyond any of the first four ranges in the table (as entered for groups A, first B, first C and F), the device does not support the classes under this part of these groups and thus these lower ranges may be eliminated (step 1106). Next, since the returned OID fell into a group C range, it is known that group C is supported, and is thus marked accordingly at step 1108. For example, a bit mask may be maintained which has a bit for each group, and when a group is supported, the bit corresponding thereto is set in the bitmask. Moreover, because group C is already known to be supported, any further ranges associated with group C need not be tested and are thus eliminated from the range table at step 1110, i.e., a check for range entry (C, 1.2.4.9.1) is unnecessary. As can be readily appreciated, each such GetNext operation can significantly reduce the number of entries remaining in the range table. Further, it should be noted that groups A and F are absent as all of their range entries have been skipped, however, while a range entry for B has been skipped, its other range entry has not yet been reached, and thus group B may still be supported.

Step 1112 causes the process to repeat until no more entries and associated ranges remain in the range table. Thus, the next range to be tested will select (G, 1.2.4.2.8) for the SNMP GetNext operation. As described above, subsequent GetNext operations will use the lexicographically lowest object identifier of a group not already identified that has as an object identifier lexicographically larger than the result of the previous GetNext. Once completed, the marked subgroups identify those MIB objects and corresponding CIM classes supported.

The correlation mechanism provides a generic and scaleable method of determining the set of groups supported by an arbitrary SNMP agent. Indeed, the mechanism is still practical when the SMIR contains information from a very large number of MIBs and/or when the device being correlated supports a large number of groups. As can be readily appreciated, the correlation mechanism is highly efficient in that most of the overhead is done prior to transmitting request packets to the device. Then, for each OID is returned, it is possible to eliminate many of the possible ranges based on the value, yet without skipping any potential groups.

Moreover, as an optimization, a single request packet may include multiple GetNext requests. This returns multiple OIDs with less transmission overhead, from which additional group information may be deduced. For example, if a device is not able to return an OID above some upper value sent, but instead returns an appropriate errorcode, then entries in the range table may be simultaneously reduced from both the low end and high end to narrow in on the supported groups.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer system, a method of mapping Management Information Base (MIB) objects to non-MIB object-oriented managed object classes, comprising, enumerating the MIB objects of a MIB module, and for each MIB object, determining whether the MIB object corresponds to a scalar collection or a table collection, and if the MIB object corresponds to a scalar collection, mapping the MIB object information to a singleton class and maintaining the mapping for subsequent data modeling, and if the MIB object corresponds to a table collection, mapping the MIB object information to a class capable of describing a plurality of instances and maintaining the mapping for subsequent data modeling.

2. The method of claim 1 wherein the object classes comprise managed object format (MOF) classes.

3. The method of claim 1 wherein determining whether the MIB object corresponds to a scalar collection or a table collection comprises determining if a direct parent in a MIB tree is a named node.

4. The method of claim 1 wherein the MIB object corresponds to a scalar collection, and wherein determining whether the MIB object corresponds to a scalar collection or a table collection comprises evaluating syntax in the MIB object.

5. The method of claim 1 wherein the MIB object corresponds to a scalar collection, and wherein mapping the MIB object information to the singleton class includes accessing a mapping table.

6. The method of claim 1 wherein the MIB object corresponds to a scalar collection, and wherein mapping the MIB object information to the singleton class includes extracting properties from the MIB object.

7. The method of claim 1 wherein the MIB object corresponds to a scalar collection, and wherein mapping the MIB object information to the singleton class comprises translating the MIB object information to MOF class information.

8. The method of claim 1 wherein the MIB object corresponds to a scalar collection, and wherein mapping the MIB object information to a singleton class includes extracting the MIB object name from the scalar collection, and basing a class name thereon.

9. The method of claim 1 wherein the MIB object corresponds to a table collection, and wherein mapping the MIB object information to the class capable of describing a plurality of instances comprises accessing a mapping table.

10. The method of claim 1 wherein the MIB object corresponds to a table collection, and wherein mapping the MIB object information to the class capable of describing a plurality of instances comprises extracting keys of a keyed class of the table collection.

11. The method of claim 1 wherein the MIB object corresponds to a table collection, and wherein mapping the MIB object information to the class capable of describing a plurality of instances comprises mapping the MIB object information to a keyed MOF object.

12. The method of claim 1 wherein the MIB object corresponds to a table collection, and wherein mapping the MIB object information to the class capable of describing a plurality of instances includes extracting properties from the MIB object.

13. A computer-readable medium having computer-executable instructions for performing the method of claim 1.

14. In a computer system, a method of mapping Management Information Base (MIB) objects to non-MIB object-oriented managed object classes, comprising, enumerating the MIB objects of a MIB module, and for each MIB object, determining whether the MIB object corresponds to a scalar collection or a table collection, and if the MIB object corresponds to a scalar collection, mapping the MIB object information to a singleton class by translating the MIB object information to (Managed Object Format) MOF class information, and maintaining the mapping for subsequent data modeling, and, if the MIB object corresponds to a table collection, mapping the MIB object information to a class capable of describing a plurality of instances and maintaining the mapping for subsequent data modeling.

15. In a computer system, a method of mapping Management Information Base (MIB) objects to non-MIB object-oriented managed object classes, comprising, enumerating the MIB objects of a MIB module, and for each MIB object, determining whether the MIB object corresponds to a scalar collection or a table collection, and if the MIB object corresponds to a scalar collection, mapping the MIB object information to a singleton class and maintaining the mapping for subsequent data modeling, and if the MIB object corresponds to a table collection, mapping the MIB object information to a class capable of describing a plurality of instances by extracting keys of a keyed class of the table collection, and maintaining the mapping for subsequent data modeling.

16. In a computer system, a method of mapping Management Information Base (MIB) objects to non-MIB object-oriented managed object classes, comprising, enumerating the MIB objects of a MIB module, and for each MIB object, determining whether the MIB object corresponds to a scalar collection or a table collection, and if the MIB object corresponds to a scalar collection, mapping the MIB object information to a singleton class and maintaining the mapping for subsequent data modeling, and if the MIB object corresponds to a table collection, mapping the MIB object information to a class capable of describing a plurality of instances by mapping the MIB object information to a keyed (Managed Object Format) MOF object, and maintaining the mapping for subsequent data modeling.

* * * * *

UNITED STATES PATENT AND TRADEMARK OFFICE
CERTIFICATE OF CORRECTION

PATENT NO.   : 6,317,748 B1
DATED        : November 13, 2001
INVENTOR(S)  : Menzies et al.

It is certified that error appears in the above-identified patent and that said Letters Patent is hereby corrected as shown below:

Column 1,
Line 16, "WEBM" should read -- WBEM --.
Line 28, "communicate with a router agent determine" should read -- communicate with a router agent to determine --.

Column 2,
Line 9, "use" should read -- uses --.
Line 26, "MIBS" should read -- MIBs --.
Line 47, "If, the MIB object corresponds" should read -- If the MIB object corresponds --.

Column 12,
Line 47, "0...255" should read -- 0..255 --.

Column 14,
Line 15, "663" should read -- $66_3$ --.
Line 41, "An SNMP" should read -- A SNMP --.

Column 15,
Line 11, "query the device determine" should read -- query the device to determine --.

Column 18,
Lines 16-17, "Then, for each OID is returned, it is possible" should read -- Then, for each OID that is returned, it is possible --.

Signed and Sealed this

Twenty-sixth Day of October, 2004

JON W. DUDAS
*Director of the United States Patent and Trademark Office*